United States Patent [19]
Waldorf et al.

[11] Patent Number: 5,954,082
[45] Date of Patent: Sep. 21, 1999

[54] APPARATUS AND METHOD FOR CALIBRATING FLOAT VALVE

[75] Inventors: Lindsey E. Waldorf, Whitmore Lake; Robert P. Benjey, Dexter; Rudolph Bergsma, Ann Arbor, all of Mich.

[73] Assignee: G.T. Products, Inc., Ann Arbor, Mich.

[21] Appl. No.: 08/967,186

[22] Filed: Oct. 29, 1997

Related U.S. Application Data

[63] Continuation of application No. 08/728,351, Oct. 9, 1996, abandoned.

[51] Int. Cl.$^6$ ................................................ F16K 24/04
[52] U.S. Cl. .............................. 137/202; 137/43; 137/428
[58] Field of Search ................................ 137/43, 202, 428

[56] References Cited

U.S. PATENT DOCUMENTS 4,679,581  7/1987  Mears ......................................... 137/43
5,597,008  1/1997  Overdiek et al. .......................... 137/15

*Primary Examiner*—Gerald A. Michalsky
*Attorney, Agent, or Firm*—Young & Basile, P.C.

[57] ABSTRACT

An improved apparatus and method for calibrating a float-type vent valve for use in an automobile fuel tank. The valve is provided with a calibration plate in the lower end thereof below the float, the calibration plate defining an axially-adjustable support for the spring which balances the float. The calibration plate includes a force probe aperture through which a force measuring device of known type can be inserted to measure the downward force of the spring-balanced float at a specified distance from closure, preferably a near-closed position. The calibration plate then is adjusted up or down as needed until a position is determined where the spring-balanced float is properly calibrated, and then the calibration plate is permanently secured in place on the valve body so that the valve remains calibrated.

13 Claims, 2 Drawing Sheets

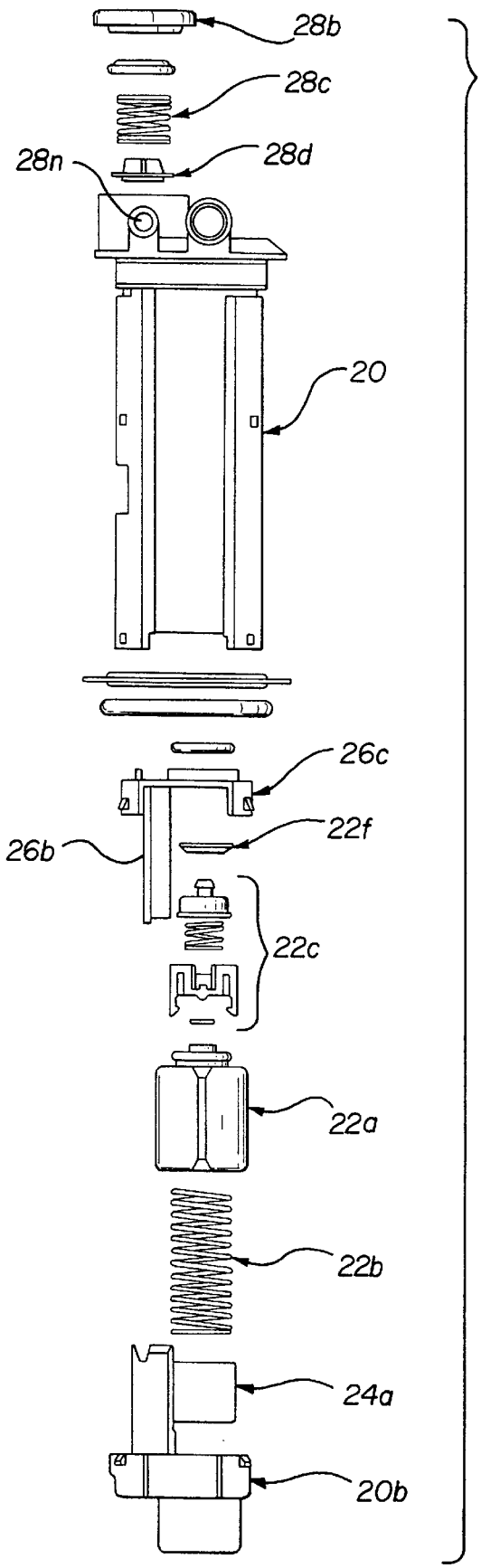
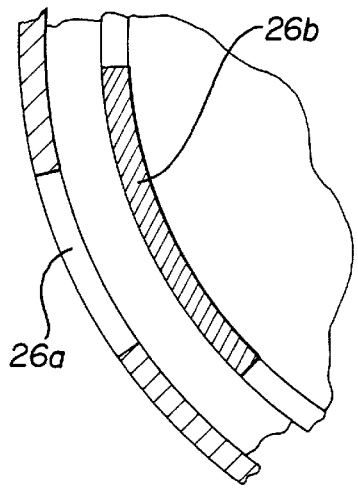
FIG-3
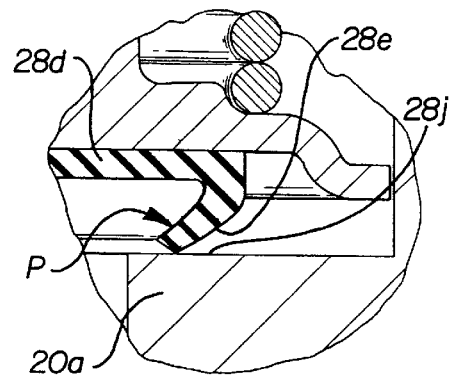
FIG-4

5,954,082

APPARATUS AND METHOD FOR CALIBRATING FLOAT VALVE

This application is a continuation of application Ser. No. 08/728,351 filled on Oct. 9, 1996, now abandoned.

FIELD OF THE INVENTION

The present invention is related to vapor vent valves for automotive fuel tanks, and more particularly to a method and apparatus for calibrating a spring-biased float member of the type commonly used in such valves.

BACKGROUND OF THE INVENTION

Automotive fuel tanks are often provided with float-type vapor vent valves, which selectively vent fuel vapor from the tank to a vapor treatment apparatus such as a carbon canister. To prevent flooding of the carbon canister with liquid fuel, vent valves are often controlled by a spring-assisted float member which rises and falls with liquid fuel levels to selectively open and close the valve.

These float members are frequently "balanced" relative to the density of liquid fuel by adjusting 1) float density, and 2) the spring assist force on the float member. Floats accordingly may have a density heavier than fuel, the same as fuel, or lighter than fuel, with an appropriate spring assist so that the desired responsiveness is obtained when the float is submerged. This process can be complicated by the need to have the float react appropriately in both upright and roll-over conditions.

While the density of the float is fairly easy to control during the manufacturing process, the relatively weak springs used in such valves has made them difficult to calibrate. Thin wire springs in a production lot can vary sufficiently to create calibration and operating problems for the valves in which they are installed. Given the importance of their protective fuel-controlling function, calibration of individual valves is often needed. Typically, valves are individually calibrated by pre-stretching or compressing individual springs until the proper calibration is achieved, or trimming them to length on an individual basis. Such prior art methods are slow, inefficient, and inexact, and are therefore subject to improvement.

SUMMARY OF THE INVENTION

The present invention is an apparatus and method for calibrating a float valve spring in an automotive fuel vapor vent valve without altering the spring itself. Accordingly, variations in the springs among individual valves do not require adjustments of the springs themselves. Instead, the valve is provided at its lower end with a calibration spool or plate which serves as an axially adjustable rest for the lower end of the spring (the upper end of the spring is positioned against the float itself). The calibration plate includes an aperture for a force measuring probe which can be inserted through the plate and applied to the float to measure the effective spring force on the float. To calibrate the individual valves within desired specifications, the calibration plate is adjusted up or down to vary the effective combined spring/float force, and then the calibration plate is fixed in place, for example by spot welding it to the valve body.

In a further form the invention is a multi-step method in which 1) a float-type vent valve is provided with a calibration plate as described above, 2) a force measuring device is inserted through the calibration plate against the float to measure force at a desired position (preferably just prior to valve closure) 3) the calibration plate is adjusted axially to obtain a specified load at a specified float position, and 4) the calibration plate is fixed in place so that the valve remains calibrated.

Additional advantages and features of the invention will become apparent upon reading the following description of an illustrative embodiment.

BRIEF DESCRIPTION OF THE DRAWINGS

FIG. 2 is an exploded assembly view of the main components of the valve of FIG. 1;

FIG. 3 is a sectional plan view of the anti-splash baffle structure in the valve embodiment of FIG. 1; and FIG. 4 is a detailed side view of the pressure relief valve lips in the valve of FIG. 1.

DETAILED DESCRIPTION OF THE ILLUSTRATED EMBODIMENTS

Figure 1:
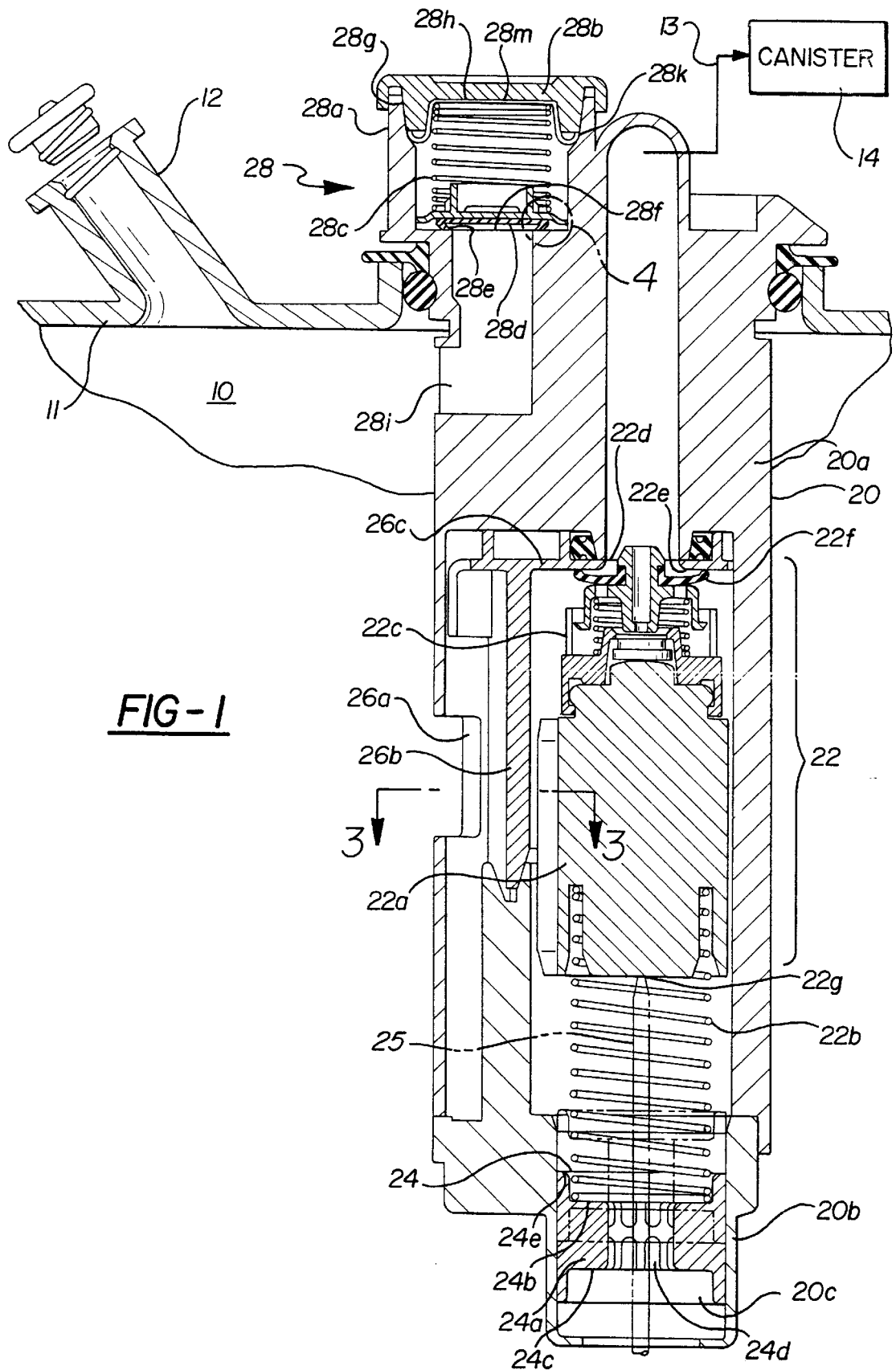
FIG. 1 is a side section view of a float vent valve incorporating the present invention, mounted in the fuel tank and connected to a carbon canister.

Referring first to FIG. 1, an automotive fuel tank 10 is shown with a standard filler pipe 12 and a carbon canister type vapor collecting apparatus 14 for processing excess fuel vapor released from the tank. A float-type vent valve 20 incorporating the present invention is shown mounted to the tank in typical fashion, i.e. mounted to the top wall 11 of the tank through a suitable aperture sized to receive the valve. Vent valve 20 extends at least partially into the interior of the tank to a point designed to be submerged by relatively high fuel levels in the tank. Vent valve 20 selectively opens and closes a venting pathway 13 from the tank to canister 14 in response to fuel level. For example, as liquid fuel level rises toward a full level during refueling, liquid fuel rising over vent valve 20 will progressively force an internal float valve mechanism 22 upwardly to a closed position, shutting off the flow of fuel vapor from the tank through valve 20 to canister 14 via pathway 13.

Vent valve 20 includes a float valve mechanism 22 comprising a float 22a, a spring 22b, a valve assembly 22c on the upper end of the float, a vent outlet 22d communicating with vent line 13 to the canister, and a valve seat 22e which is engaged in sealing fashion by the valve assembly 22c to close the valve in response to rising fuel level.

Float valve mechanism 22 can be mass-balanced in known manner as desired for preferred action in liquid fuel. Some known options include a lighter than fuel float, a float of neutral buoyancy in fuel, or a heavier than fuel float. Spring 22b is provided to cooperate with the desired float density to achieve an appropriate responsiveness for proper opening and closing under various operating conditions. The variations in mass balancing the float/spring combination for different applications are well known to those skilled in the art, and are not in themselves part of the present invention.

Adjusting the responsiveness of the float also adjusts the effective "full" fuel level in the tank if vent valve 20 is used as a fill control valve. For example, increasing spring force on the float effectively lightens the float, making it more responsive to fuel level and lowering the "full" level at which the float closes and reducing the total fuel capacity of the tank.

The valve assembly 22c on the upper end of the float may take any known form; the illustrated embodiment of valve assembly 22c is one of many valve closing mechanisms which can be applied to the float. The variety of suitable valve structures will be apparent to those skilled in the art.

Although the float spring combination in vent valve 20 can be designed for general buoyancy characteristics or responsiveness in liquid fuel, the combination must be fine-tuned or calibrated for precise operation. The present invention provides for just such calibration in a simple and economical manner.

In order to carry out the present invention, vent valve 20 is provided at its lower end with a float calibration mechanism 24 comprising a calibration plate 24a. The illustrated calibration plate 24a includes an upper spring seat 24b, a push-to-calibrate lower surface 24c, a force probe aperture 24d, and a portion or surface 24e which can be fastened to the valve body in permanent or semi-permanent manner once the calibration is complete, for example by spot welding to the valve body.

Referring now to FIGS. 1 and 3–4, the operation of the float calibration mechanism 24 will be described. Calibration plate 24a is axially adjustable within the lower portion 20b of the vent valve, sliding smoothly up and down in calibration chamber 20c. The fit between the outer surface 24e of calibration plate 24a and the inner surface of the lower valve body chamber housing the calibration plate is preferably toleranced for a sliding friction fit such that calibration plate 24a remains in position, even against the force of spring 22b, when it is released.

Although the term "plate" is used with reference to calibration plate 24a, it will be understood from the drawing that it need not literally be plate-shaped. In the illustrated embodiment calibration plate 24a takes the preferred form of a cylindrical symmetrical spool, but other shapes are possible provided they provide a seat or support for the spring and a push/pull-to-calibrate function.

The preferred method for calibrating the float mechanism 22 is to measure the grams of force which the weight of the float 22a (balanced by spring 22b) exerts just prior to valve closure, i.e. when seal member 22f of valve assembly 22c is about to engage valve seat 22e. This is typically a small distance, for example on the order of 0.015 to 0.020 inches, although this is variable depending on the functional requirements of the particular valve. In the present invention this force is measured by inserting a force probe 25 of known type, for example a strain gauge type probe, through aperture 24d in calibration plate 24a against the bottom of float 22a at 22g, and pushing the float upwardly until it is at the desired point, here just prior to closure. By measuring the force exerted against the probe by the spring-balanced float 22a, it can be determined by one skilled in the art whether the upward spring force on the float needs to be higher or lower. If lower, then calibration plate 24a is adjusted downwardly in chamber 20c, effectively reducing the force of the spring on the float just prior to closure. If the upward spring force just prior to closing needs to be increased, then the calibration plate 24a is moved upwardly in chamber 20c until the proper force balance is achieved. In this respect aperture 24d plays a dual role, not only providing an entry for the force probe, but further providing a purchase for pulling plate 24a down.

In use the mechanism of the present invention has been found to achieve accuracies within plus or minus 0.10 grams at a specified distance and load for calibration. It will be appreciated by those skilled in the art that the calibration plate can be adjusted up or down as desired until the float valve is calibrated as close as possible to the desired force at specified distance and load.

Once the valve has been calibrated as described above, the calibration plate is then fixed in place, for example in the illustrated embodiment by spot welding a portion 24e of the outer surface of the plate to the inner surface of chamber 20c. However, it will be apparent to those skilled in the art that various known techniques may be used to fix calibration plate 24a in place, including different welding techniques, adhesives, or even mechanical means such as but not limited to pins or snap-detents.

It will be appreciated that the calibration plate is preferably centered with respect to the longitudinal axis of the float mechanism 22, in order to provide accurate force measurements via the in-line force probe aperture 24d.

The present invention is illustrated in a float-type vent valve incorporating additional features of an inventive nature. Referring to FIGS. 1 and 3, the presently illustrated vent valve includes an anti-splash baffle structure 26 designed to limit the entry of liquid fuel through radial ports 26a in the float valve body which would tend to splash up through vent outlet 22d before the float mechanism 22 has closed. One or more radial ports 26a are needed to provide adequate vapor venting through the valve when the fuel level lies below them. However, sloshing and splashing of the fuel in the tank can create surges which break over and through port(s) 26a, threatening to splash liquid fuel through vent outlet 22d and into the carbon canister. This is undesirable, because the carbon canister is designed to handle vapor rather than liquid fuel, and quickly becomes saturated and its function thereby impaired.

In the illustrated embodiment, baffle structure 26 includes a baffle plate 26b having a width (or circumferential length) approximately equal to or greater than the width (or circumferential length) of window 26a. While only a single window 26a with a single corresponding baffle 26b is illustrated, it will be apparent to those skilled in the art that multiple baffles 26b can be provided to protect multiple windows.

In the illustrated embodiment, baffle 26b is formed as an integral, downwardly-depending portion of a unique baffle plate structure 26c (FIG. 2) which also defines vent outlet 22d and valve seat 22e at an upper end of the float chamber 22h. It is not necessary for baffle 26b to be formed as an integral part of baffle plate structure 26c as illustrated, although this is a presently preferred form. Baffle plate 26b may be fastened or positioned within the valve body in any known manner to protect against splash-through from radial ports 26a.

Also disclosed in the illustrated vent valve embodiment is a novel pressure relief assembly 28 located at the upper end of the valve, comprising a housing 28a, a cover 28b, a relief spring 28c, a relief seal member 28d with sealing lips 28e, a vent orifice 28f, a weld joint 28g, and a steel stamping 28h which provides seal protection and spring retainer functions. Referring to FIGS. 1 and 4, the pressure relief assembly operates to selectively open and close venting through a pressure relief port 28i formed in the side of the upper portion 20a of vent valve 20. Release spring 28c maintains relief seal member 28d in the closed position shown in FIG. 1, with sealing lips 28e held firmly against valve seat 28j to block the flow of vapor from the fuel tank through pressure relief port 28i vent orifice 28f, and pressure relief outlet 28n to a suitable relief point (not shown), such as the atmosphere or the carbon canister. When vapor pressure in the fuel tank rises above a predetermined safety level, the vapor pressure will overcome the force of relief spring 28c to force seal member 28d off its valve seat and open relief venting through port 28i to the relief point.

Pressure relief assembly 28 includes a number of individually novel features. Seal member 28d exhibits sealing lips 28e having a reverse, inwardly-facing contour which provides an unusually supple (therefore secure) sealing surface with the valve seat 28j, and further allows pressure P from the fuel tank to aid the spring in the sealing action as shown in FIG. 4. Pressure from the fuel tank, illustrated at arrow P, engages the interior surface of reverse lips 28e to assist in forcing the lips into sealing engagement with the valve seat. In this manner vapor pressure from the tank aids sealing until the lips finally leave the seating surface.

Another feature of pressure relief assembly 28 is the secondary spring retainer 28h, in the illustrated embodiment a resilient steel stamping preferably having a non-vaportight engagement with housing 28a, or optionally having a small pressure relief port illustrated at 28m. Spring retainer 28h is preferably a resilient metal, with an outer lip portion 28k which engages or "bites" into the plastic material of the pressure relief housing 28a when inserted to stay in place. This allows a simple press-mounting of the spring into housing 28a via the retainer before the cover 28b is welded into place. The optional pressure relief port 28m in spring retainer 28h is relatively small, for example on the order of 0.010 inches in diameter. The non-vaportight fit between the retainer 28h and housing 28a, and/or the optional pressure relief port 28m, prevents pressure buildup between retainer 28h and cover 28b when the cover is welded in place. Retainer 28h with its tight press-fit into the bore of housing 28a additionally prevents weld flash and dust from falling into or contaminating the resilient rubber pressure relief seal 28d.

It will be apparent to those skilled in the art that the foregoing description of an illustrated embodiment is exemplary in nature, and can be modified for various vent valve applications without departing from the scope of the invention defined by the following claims.

We claim:

1. In combination with a spring-balanced float in a vent valve for a vehicle fuel tank, an apparatus for calibrating the float comprising:

calibration plate means located in a lower portion of the vent valve below the float, the calibration plate means comprising an axially adjustable support for a lower end of the spring and an aperture designed to allow the insertion of force measuring means through the calibration plate means against the float.

2. The apparatus of claim 1, wherein the calibration plate means comprises a spring support slidable in a mating chamber formed in the lower end of the vent valve, the spring support having an upper surface defining a spring seat for the lower end of the spring, and a lower surface defining a push-to-calibrate surface.

3. The apparatus of claim 2, wherein the calibration plate means engages the chamber in the lower end of the valve body in a sliding friction fit capable of retaining the calibration plate means in place against the force of the spring on the spring seat when the calibration plate means is released.

4. The apparatus of claim 3, further including means for more permanently securing the calibration plate means axially in place in the chamber.

5. The apparatus of claim 4, wherein the means for more permanently securing the calibration plate means in place comprises a surface on the calibration plate means capable of being welded to the valve body.

6. The apparatus of claim 4, wherein the means for securing the calibration plate means more permanently in the chamber comprises means for mechanically securing the calibration plate means to the valve body.

7. The apparatus of claim 2, wherein the calibration plate means is symmetrical, such that the spring seat and push-to-calibrate surface are interchangeable.

8. The apparatus of claim 1, wherein the vent valve further includes pressure relief means comprising a pressure relief valve chamber, a spring-biased pressure relief valve mounted in the chamber, and a press-fit valve retainer inserted in the valve chamber to hold the spring-biased pressure relief valve in position prior to securing a permanent cover on the valve chamber.

9. The apparatus of claim 8, wherein the spring-biased pressure relief valve includes a reversed lip seal element having a pressure responsive inner surface in vapor communication with the fuel tank when the pressure relief valve is closed and a pressure responsive outer surface whose sealing force against a valve seat is increased by pressure on the inner surface.

10. The apparatus of claim 8, wherein the retainer includes a pressure relief means for communicating pressure from the region between the retainer and the cover to the pressure relief valve chamber.

11. The apparatus of claim 1, wherein the vent valve further includes a radial venting port in a side surface of the vent body, and anti-splash baffle means associated with the radial venting port in the interior of the valve body.

12. A method for calibrating a spring-balanced float in a vent valve for a vehicle fuel tank, comprising the following steps:

providing the vent valve with an axially adjustable spring support in a lower portion of the valve below the float for supporting the lower end of the spring acting on the float, the axially-adjustable spring support further including an aperture designed to admit force measuring means to be inserted against the float;

inserting force measuring means through the aperture to move the float to a desired position, and measuring the downward force of the float as balanced by the spring while the spring is seated on the axially-adjustable spring support in a first calibration position;

adjusting the axially-adjustable spring support as needed while the float is at the desired position until the downward force of the float as measured by the force measuring means meets a predetermined calibration standard, thereby defining a second calibration position; and securing the spring support to the vent valve in the second calibration position.

13. The method of claim 12, wherein the desired position to which the float is moved by the force measuring means is a near-closed position.

* * * * *

UNITED STATES PATENT AND TRADEMARK OFFICE
CERTIFICATE OF CORRECTION

PATENT NO. : 5,954,082
DATED : September 21, 1999
INVENTOR(S) : Waldorf et al.

It is certified that error appears in the above-identified patent and that said Letters Patent is hereby corrected as shown below:

Column 1, line 67, after "desired" insert --float--.

Column 2, line 2, delete "a specified" and insert --the desired--.

Column 5, line 54, after "means" insert --axially--.

Column 5, line 58, before "permanently" delete "more".

Column 6, line 1, after "for" delete "more".

Column 6, line 2, after "means" delete "in place".

Column 6, line 5, after "for" insert --permanently--.

Column 6, line 6, after "means" delete "more permanently", after "in" insert --place --.

UNITED STATES PATENT AND TRADEMARK OFFICE
CERTIFICATE OF CORRECTION

PATENT NO. : 5,954,082
DATED : September 21, 1999
INVENTOR(S) : Walforf, et al

It is certified that error appears in the above-identified patent and that said Letters Patent is hereby corrected as shown below:

Column 6, line 7, delete "the chamber".

Column 6, line 25, before "retainer" insert --valve--.

Column 6, line 36, insert -- - -- between "axially adjustable".

Column 6, line 37, before "valve" insert --vent--.

Column 6, line 38, after "supporting" delete "the" and insert --a--.

Column 6, line 39, after "spring" delete "acting on the float".

Column 6, line 53, after "securing the" insert --axially-adjustable--.

Signed and Sealed this

Twenty-third Day of May, 2000

Attest:

Attesting Officer

Q. TODD DICKINSON

Director of Patents and Trademarks